US008291418B2

(12) United States Patent
Mitchell (10) Patent No.: US 8,291,418 B2
(45) Date of Patent: Oct. 16, 2012

(54) SUB-DISPATCHING APPLICATION SERVER

(75) Inventor: Ian J. Mitchell, Hants (GB)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 12/563,745

(22) Filed: Sep. 21, 2009

(65) Prior Publication Data

US 2010/0088700 A1    Apr. 8, 2010

(30) Foreign Application Priority Data

Oct. 2, 2008  (EP) ..................... 08165738

(51) Int. Cl.
*G06F 3/00* (2006.01)
*G06F 9/44* (2006.01)
*G06F 9/46* (2006.01)
*G06F 13/00* (2006.01)

(52) U.S. Cl. ......... 718/100; 718/101; 718/106; 719/319

(58) Field of Classification Search ......... None
See application file for complete search history.

(56) References Cited

U.S. PATENT DOCUMENTS

| 5,951,694 | A | * | 9/1999 | Choquier et al. | ............... | 714/15 |
| 6,247,056 | B1 | * | 6/2001 | Chou et al. | .................... | 709/229 |
| 6,282,581 | B1 | * | 8/2001 | Moore et al. | .................. | 719/316 |
| 6,832,238 | B1 | * | 12/2004 | Sharma et al. | ................ | 709/201 |

OTHER PUBLICATIONS

Hackenberg, Steven R. CICS Open Transaction Environment and Other TCB Performance Considerations. [online] (2006). IBM, pp. 1-8. Retrieved From the Internet <http://citeseerx.ist.psu.edu/viewdoc/download?doi=10.1.1.83.3952&rep=rep1&type=pdf>.*
Kettley, Paul. CICS TS for z/OS V3.2 Technical Overview. [online] (Jun. 29, 2007). IBM, pp. 1-52. Retrieved From the Internet <ftp://129.35.224.112/software/htp/cics/PDF/Impact2007-4279.pdf>.*
Rayns et al. Threadsafe Considerations for CICS. [online] (Jul. 30, 2010). IBM, pp. 1-392. Retrieved From the Internet <http://www.redbooks.ibm.com/redpieces/pdfs/sg246351.pdf>.*
Baker, Chris. CICS Transaction Server for z/OS Monitoring and Statistics. [online] (2007). IBM, pp. 1-43. Retrieved From the Internet <ftp://170.225.15.40/software/htp/cics/PDF/Impact2007-4932A.pdf>.*

* cited by examiner

*Primary Examiner* — Emerson Puente
*Assistant Examiner* — Jonathan R Labud
(74) *Attorney, Agent, or Firm* — Lee Law, PLLC; Christopher B. Lee (57) ABSTRACT

Multiple sub-dispatched application server threads are provided in a single local process, where the multiple sub-dispatched application server threads carry out their own task dispatching. The multiple sub-dispatched application server threads are linked in the single local process using a distributed programming model. Scope-aware access is managed by the multiple sub-dispatched application server threads to shared memory content. It is determined if an application request is eligible to execute at a local sub-dispatched application server thread.

20 Claims, 9 Drawing Sheets

SUB-DISPATCHING APPLICATION SERVER

RELATED APPLICATIONS

This application claims priority to and claims the benefit of European Patent Application Serial No. EP08165738.9 titled "SUB-DISPATCHING APPLICATION SERVER," which was filed in the European Patent Office on Oct. 2, 2008, and which is incorporated herein by reference in its entirety.

BACKGROUND

The present subject matter relates to the field of sub-dispatching application servers. In particular, the present subject matter relates to operation of transaction servers as sub-dispatching application servers that carry out their own task dispatching on operating system threads.

A transaction server is a component that is used in implementing transactions. A transaction involves multiple steps which must be completed atomically. For example, when paying someone from a bank, the system must guarantee that the money is taken from one account and paid into another person's account. Both actions must occur in order for the transaction to have taken place.

In the case of a transaction failing, it may then be "backed out" (or "rolled back"), which will mean that the system reverses all the actions that happened during the partial completion of the transaction.

A transaction server consists of a system providing the safety described above, and an environment where programs may be written to make use of these features. It will also have various connection protocols to allow it to connect to the databases involved, and to the front end software.

BRIEF SUMMARY

In order to optimize performance, transaction servers often operate as sub-dispatching application servers. That is, they implement their own dispatcher that runs on an operating system thread.

One form of transaction server is the customer information control system (CICS®) of IBM® (CICS and IBM are trade marks of International Business Machines Corporation). Within the z/OS® operating system a thread is known as a Task Control Block (TCB) (z/OS is a trade mark of International Business Machines Corporation).

In CICS, a region has one primary thread known as a quasi-reentrant TCB or QR TCB on which most transactions run. Multiple tasks are managed on a QR TCB. The operating system thread is dispatched to one of the actual processors available by the z/OS dispatcher. If multiple OS threads (e.g., TCBs) are used in a process (e.g., address space), then the code running on those TCBs needs to recognize and account for potentially concurrent execution of other code on other TCBs when referencing memory. This is typically referred to as being "threadsafe." That is, safe to execute on a thread in its own right in the presence of other threads.

Transaction servers often use a single thread and sub-dispatch application code on that single thread since this may result in more efficient processing. Therefore, the application code does not have to be concerned with any other thread referencing memory concurrently. This is a programming model known as quasi-reentrant programming, but limits the capacity of each server to a single processor.

Resources represented by control blocks in the address space that are managed by non-threadsafe code must be accessed serially. That is, by one thread (e.g., in the CICS case, a CICS task) at a time. This serialization may be achieved with the use of explicit locks or implicitly by realizing that only one task is dispatched at a time on the QR TCB.

In order to support greater workloads by using more processors, a distributed programming model has been created so that an application may be deployed onto multiple transaction server instances. Each user request would be routed to one of potentially many independent server instances, and the application may make calls to services that the system may route on to other server instances. Thus, many more processors, each running an instance of a sub-dispatching application server in its own address space may be utilized.

The distributed programming model was made to hide most of the semantic impacts of a service being remote from the invoking application (such as distributed program link (DM), function shipping or transaction routing). Since the sub-dispatching application server instances were in different address spaces, the data passed to and from a service would have to be packaged up and sent over a communications link from one address space to another. This overhead (in terms of processing required to ship requests, and in operations to manage multiple server instances) is the price paid by a simple quasi-reentrant programming model to exploit multiple processors.

The distributed programming model does not make all the resources available in one address space available to the services running remotely in another. For example, whilst transaction routing makes the commands controlling a terminal directly attached to a terminal owning region available in an application owning region, distributed program link (a form of function shipping) does not pass on any such capability.

Deploying additional servers to exploit more processors is more management overhead (both in processor resource and human terms) than being able to add a processor to a server that handles true concurrency (and expects its applications to do likewise).

Transaction servers have more recently provided an option to run threadsafe applications using multiple threads in a single server. This is the CICS "Open Transaction Environment" (OTE), but this requires that application programs must be made threadsafe.

According to a first aspect of the present invention there is provided a system including a transaction server configured to: provide multiple sub-dispatched application server threads in a single local process, wherein each sub-dispatched application server thread is managed by a sub-dispatching component; and link the multiple sub-dispatched application server threads in the single local process using a distributed programming model; and a local memory manager that is scope-aware for managing access by the multiple sub-dispatched application server threads to shared memory content; and a router component for determining if an application request is eligible to execute at a local sub-dispatched application server thread.

According to a second aspect of the present invention there is provided a method for operating a transaction server with sub-dispatched application server threads comprising: providing multiple sub-dispatched application server threads in a single local process, wherein the multiple sub-dispatched application server threads carry out their own task dispatching; linking the multiple sub-dispatched application server threads in the single local process using a distributed programming model; managing scope-aware access by the multiple sub-dispatched application server threads to shared memory content; and determining if an application request is eligible to execute at a local sub-dispatched application server thread.

According to a third aspect of the present invention there is provided a computer program product stored on a computer readable storage medium for operating a transaction server with sub-dispatched application server threads, comprising computer readable program code configured to: provide multiple sub-dispatched application server threads in a single local process, wherein the multiple sub-dispatched application server threads carry out their own task dispatching; link the multiple sub-dispatched application server threads in the single local process using a distributed programming model; manage scope-aware access by the multiple sub-dispatched application server threads to shared memory content; and determine if an application request is eligible to execute at a local sub-dispatched application server thread.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

DETAILED DESCRIPTION

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present subject matter.

A sub-dispatching application server is provided as a middleware product which carries out its own task/thread dispatching rather than relying on the operating system to do this. There are multiple sub-dispatched OS threads and multiple instances of the sub-dispatching components in a single local process. The sub-dispatching components manage the tasks and use a sub-dispatched thread. Problems with concurrency are avoided by virtualizing or linking the multiple instances of sub-dispatching components in one process using a remote or distributed programming model.

Multiple sub-dispatching components are run in the same address space, applying a remote programming model and its restrictions to enable the programs to remain quasi-reentrant rather than making them truly threadsafe. Processing and operational overheads are reduced as data that would have had to be transmitted from one address space to another will no longer need to be moved, and fewer servers may be used to exploit the same number of actual processors.

Referring to FIGS. 1 to 4 systems known in the prior art are shown in order to explain the background art.

Figure 1:
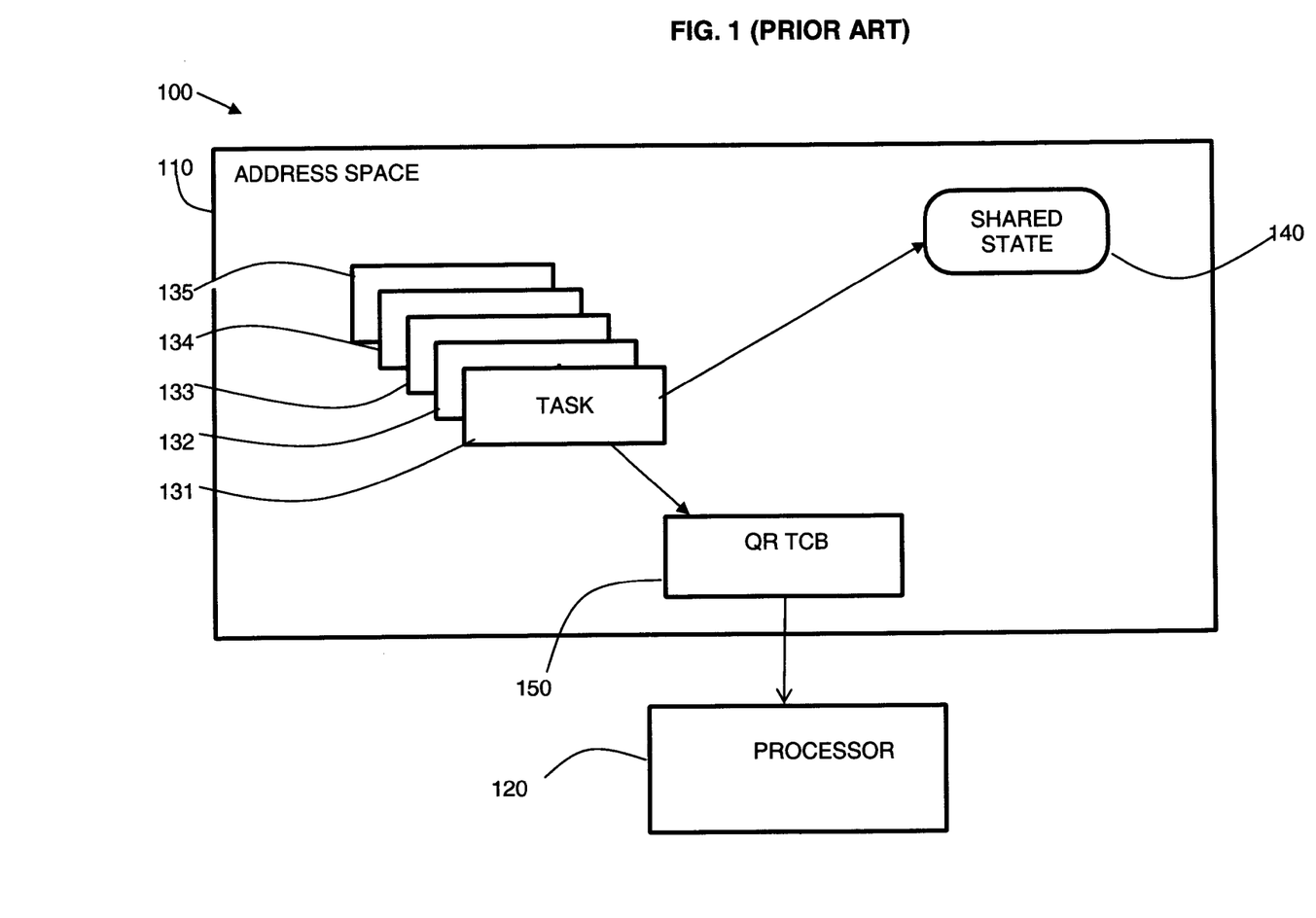
FIG. 1 is a block diagram of system as known in the prior art with a single process on a sub-dispatching application server according to an aspect of the present subject matter.

FIG. 1 shows a system 100 with a single process on a sub-dispatching application server. For example, a single CICS transaction server instance on z/OS without Open Transaction Environment.

An address space 110 is provided associated with a processor 120. Multiple tasks 131-135 execute in the address space 110 accessing a shared state memory 140. A single QR TCB 150 in the address space 110 has access to the processor 120.

Programming the business logic executed on the multiple tasks 131-135 is based upon the absence of true concurrency. One task at a time executes on the QR TCB 150 and has access to the processor 120. Shared state memory 140 between tasks 131-135 is not accessed concurrently.

Figure 2:
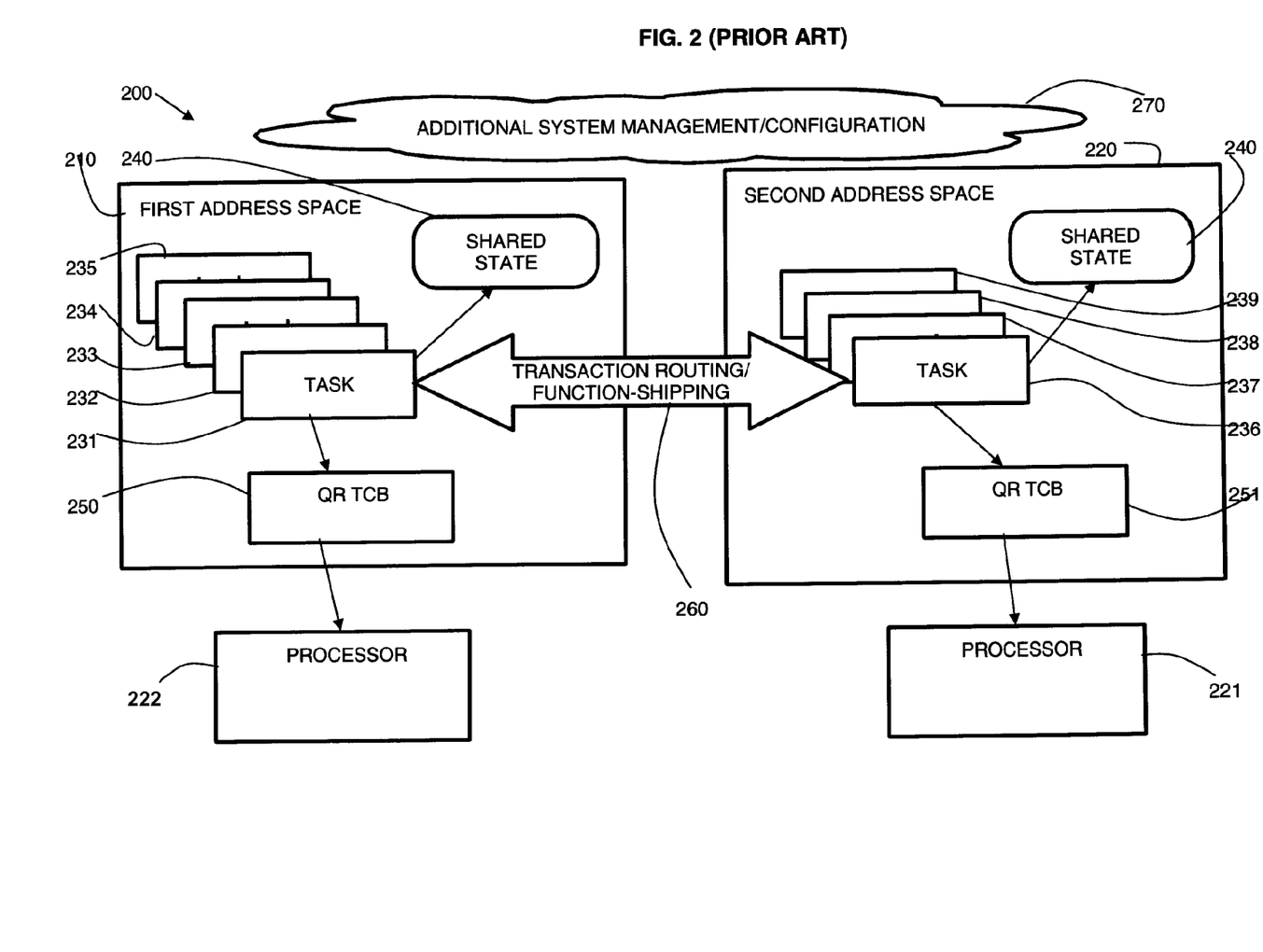
FIG. 2 is a block diagram of a system as known in the prior art with multiple processes on multiple sub-dispatching application servers according to an aspect of the present subject matter.

FIG. 2 shows a system 200 with multiple processes on a sub-dispatching application server. For example, multiple CICS transaction server instances on z/OS without Open Transaction Environment).

A first address space 210 is provided executing on a first processor 222. Multiple tasks 231-235 execute in the first address space 210 accessing a shared state memory 240. A single QR TCB 250 in the first address space 210 has access to the first processor 222.

A second address space 220 is provided executing on a second processor 221. Multiple tasks 236-239 execute in the second address space 220 accessing the shared state memory 240. A single QR TCB 251 in the second address space 211 has access to the second processor 221.

Additional system management and configuration 270 is required for transaction routing and function shipping 260 between the first and second address spaces 210, 220.

A business request may be routed or shipped between servers so that more processors 222, 221 may be exploited. References to memory state 240 are local to each address space 210, 220 (process) and so the business logic is still unaffected by concurrency complications. No shared state is directly referenced across a server boundary.

Figure 3:
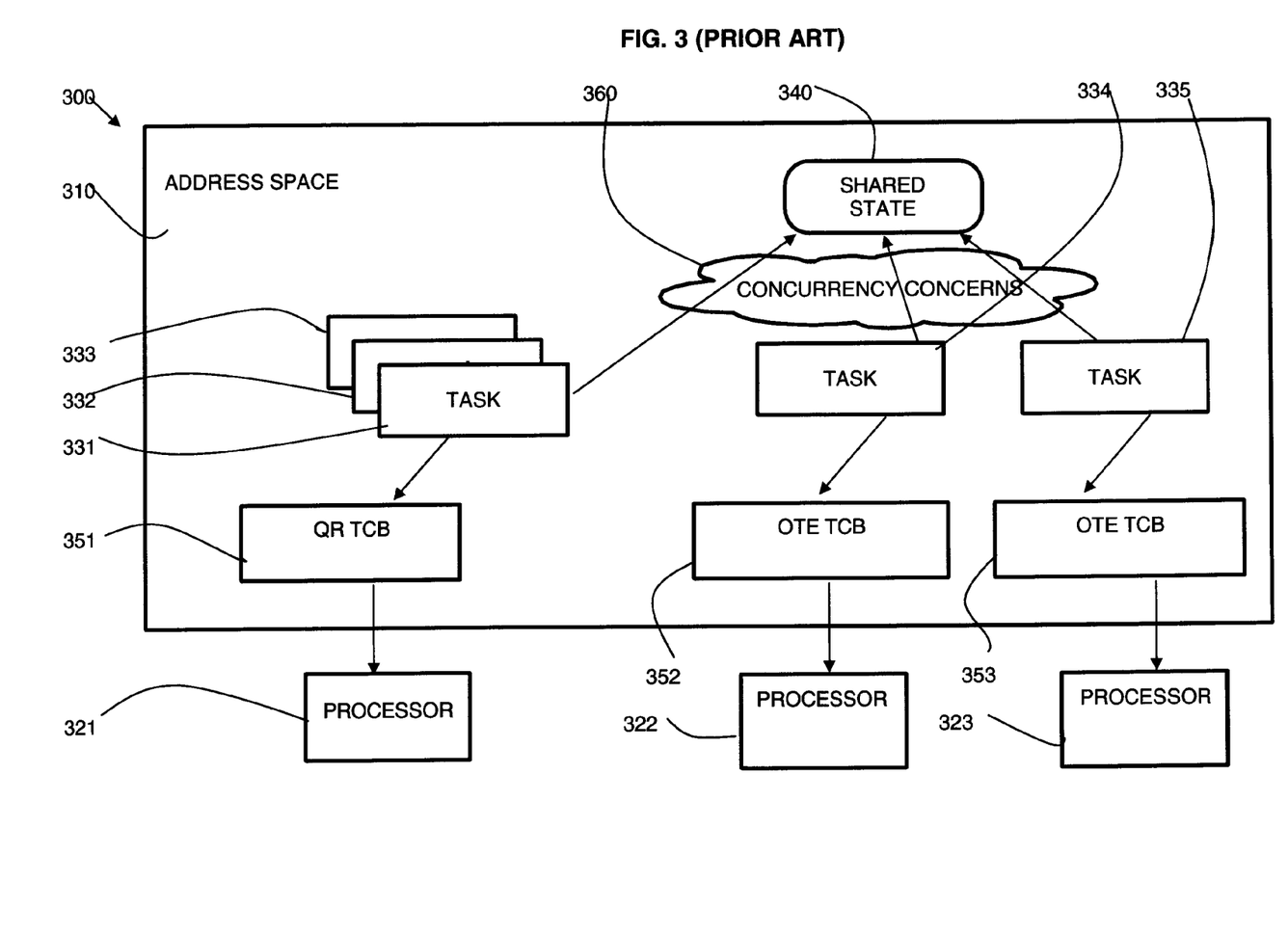
FIG. 3 is a block diagram of a system as known in the prior art with a single process on a concurrent application server according to an aspect of the present subject matter.

FIG. 3 shows a system 300 with a single process on a concurrent application server. For example, a single CICS transaction server instance on z/OS with Open Transaction Environment. Open Transaction Environment allows requests to exploit multiple processors 321-323 within a single address space 310 or process. This means true concurrency concerns must be handled in the middleware or business logic.

FIG. 3 shows the system 300 with a single address space 310 with a QR TCB 351 which may handle multiple tasks 331-333 and multiple OTE TCBs 352-353 each handling single tasks 334, 335. Each of the TCBs 351-353 executes on its own processor 321-323. The tasks 331-333, 334, 335 execute in the address space 310 accessing a shared state memory 340. Concurrency concerns 360 are handled in the middleware or business logic.

Figure 4:
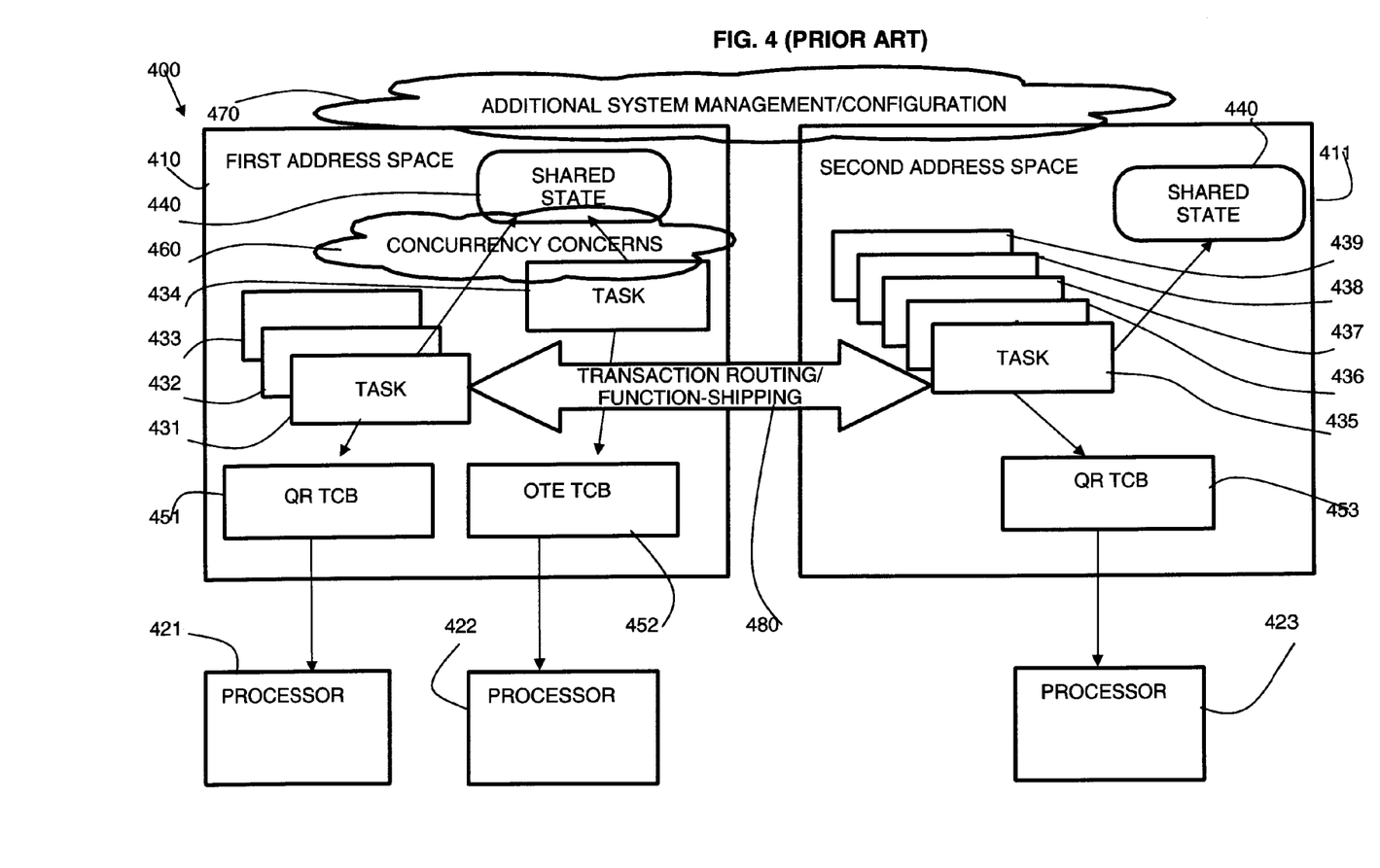
FIG. 4 is a block diagram of a system as known in the prior art with multiple processes on a concurrent application server according to an aspect of the present subject matter.

FIG. 4 shows a system 400 with multiple processes on a concurrent application server. For example, multiple CICS transaction server instances on z/OS with Open Transaction Environment.

FIG. 4 shows the system 400 with a first address space 410 with a QR TCBs 451 which may handle multiple tasks 431-433 and an OTE TCB 452 with a single task 434. The TCBs 451, 452 each execute on its own processor 421-422. The tasks 431-433, 434 execute in the first address space 410 accessing a shared state memory 440. Concurrency concerns 460 are handled in the middleware or business logic.

A second address space 411 is shown with a QR TCB 453 executing on its own processor 423. Multiple tasks 435-439 execute in the second address space 411 accessing the shared state memory 440.

As in the system 200 of FIG. 2, additional system management and configuration 470 is required for transaction routing and function shipping 480 between the first and second address spaces 410, 411.

Figure 5:
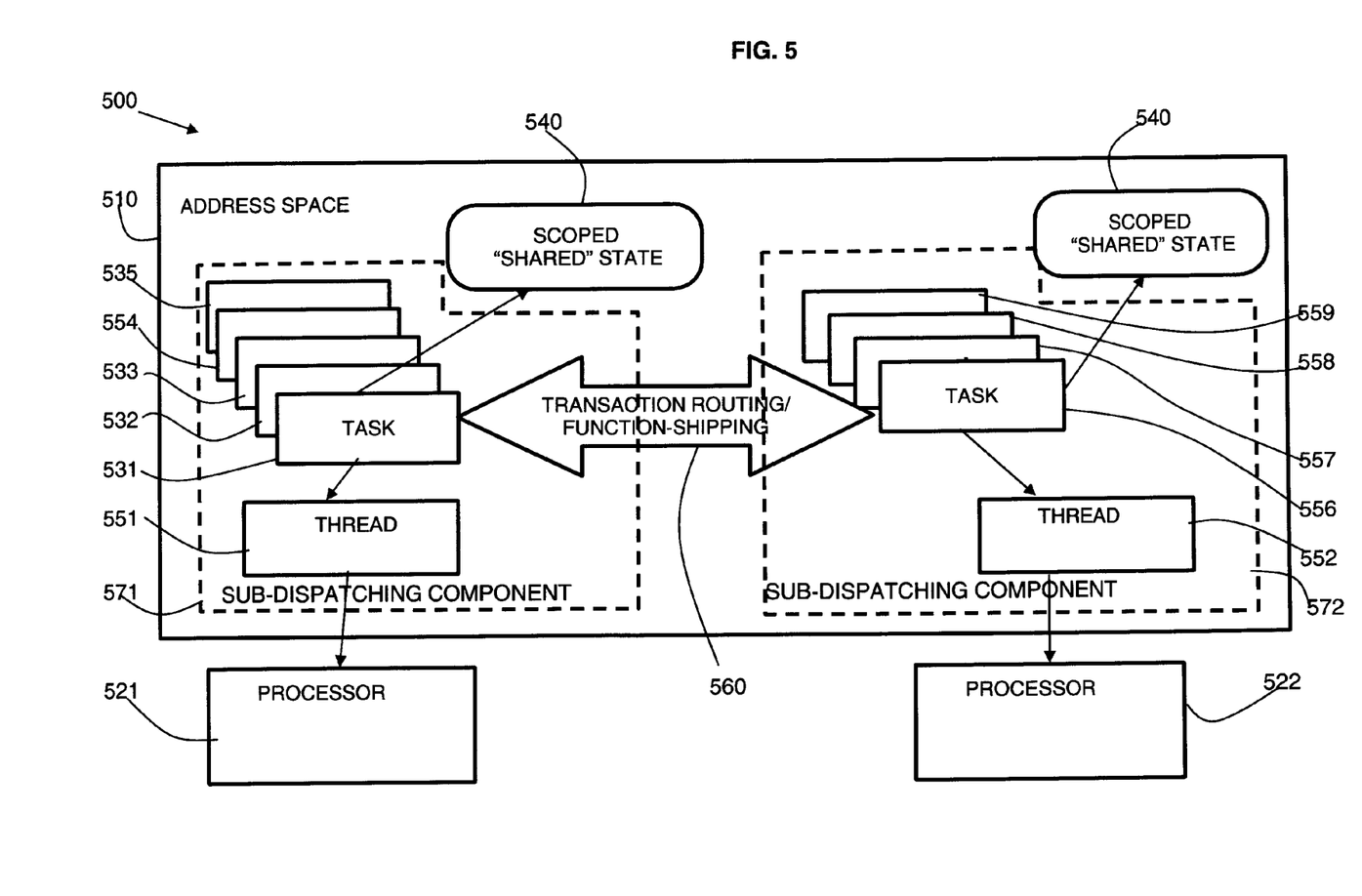
FIG. 5 is a block diagram of a representation of a system with a single process with multiple sub-dispatching application servers according to an aspect of the present subject matter.

Referring to FIG. 5, the described system 500 is shown in accordance with the present subject matter. FIG. 5 shows a system 500 with a single process with multiple sub-dispatching application servers. For example, multiple CICS transaction server instances without Open Transaction Environment.

FIG. 5 shows the system 500 with a single address space 510 with a first sub-dispatched thread (for example, a TCB or also known as a fiber) 551 which may handle multiple tasks 531-535 and a second sub-dispatched thread (for example, a TCB or fiber) 552 which may handle multiple tasks 556-559. Sub-dispatching components 571, 572 manage the tasks and use a sub-dispatched thread 551, 552, respectively. The sub-dispatched threads 551, 552 each execute on their own processors 521-522. The tasks 531-535 and 556-559 execute in the same address space 510 but access scoped "shared" state memory 540.

Removing the process boundary simplifies the system management and configuration, but scoping of the "shared" state memory is performed to avoid the need for true concurrency controls thereby maintaining a more concise programming model.

The separate sub-dispatched threads 551, 552 each operate within sub-dispatching components 571, 572 with transaction routing and function shipping component 560 between the sub-dispatching components 571, 572.

A sub-dispatching application server is a middleware product that carries out its own task/thread dispatching rather than relying on the operating system to do this. The described method has multiple sub-dispatched OS threads (tasks in CICS) and multiple sub-dispatching components 571, 572 in a single local process address space 510 (called a region or address space in CICS). Currently, CICS uses a different CICS region for each sub-dispatched thread. Problems with concurrency are avoided by virtualizing or linking the multiple sub-dispatching components 571, 572 in one process using a remote programming model.

Running multiple sub-dispatched application server threads 551, 552 in the same address space 510, using a remote programming model enables the programs to remain quasi-reentrant rather than making them truly threadsafe. Processing and operational overheads are reduced as data that would have had to be transmitted from one address space to another no longer needs to be moved, and fewer servers may be used to exploit the same number of actual processors.

Multiple servers may still be deployed to gain other advantages such as resilience and elimination of single points of failure, but this may result in two or three servers rather than the tens required if processor exploitation is the driving force.

The described system 500 includes sub-dispatched application server threads 551, 552 which may be similar to the QR TCB that already exists, but would not have the single task assignment characteristic of the existing OTE TCBs. The sub-dispatched application server threads 551, 552 do not allow (e.g., prevent) the execution of arbitrary code that might suspend, but they execute code obeying the requirements of QR TCB—that being primarily that they do not cause (e.g., prevent) the thread to wait using operation system services that would deny (e.g., stop) other tasks on the thread the opportunity to execute. They also manage distinct sets of resources (dynamic storage, files etc) just as multiple connected servers do. However, they are able to share other resources (e.g. program storage, the system log).

The remote or distributed programming model is used for Transaction Routing, Distributed Transaction Processing (DTP) and Function Shipping. The described subject matter relates to Function Shipping, and in particular to the Distributed Program Link form of function shipping. However, the described subject matter may be applied to both Transaction Routing and DTP.

A program link is an invocation of a functional component operating synchronously on the current logical thread of control, passing input parameters in and receiving output parameters on return. In its non-distributed form, the parameters may include pointer references to other storage areas within the current server memory address space—either as input or as output. In its distributed form, passing such pointers from one server to another is invalid. Thus in the distributed form, the parameters passed from one program to another across a server boundary are self-contained.

Function shipping also applies to accessing resources in other servers, but the described method and system may not apply as usefully in those cases since the resources are likely to be tightly bound to the servers they reside in, and thus may not be moved back into the caller's address space as easily as a program may.

When a transaction server program issues a command to execute a program link (for example, an EXEC CICS LINK command in a CICS program), control passes to a second program (often referred to as a linked-to program) that is named in the link command. The second program executes and, after completion, returns control back to the first program (referred to as the linking program) at the next instruction.

The distributed programming model is used to extend the link command so that the linked-to program is on a remote system (often referred to as a back-end system). For example, in the CICS environment, the distributed programming model includes a defined distributed program link (DPL) function (e.g., component) which provides the remote execution requirements.

DPL provides a way of executing an execute link command on a remote system. A mirror program is used on the remote system to execute the calls. For example, a linking program issues a program-control EXEC CICS LINK command to a named program. From program definitions, CICS discovers that the named program is owned by a remote CICS system. CICS changes the EXEC CICS LINK command into a suitable transmission format, and then ships it to the remote system for execution.

In the remote system, a mirror transaction is attached. The mirror program invoked by the mirror transaction recreates the original request, issues it on the remote system, and, when the back-end program has run to completion, returns any communication-area data to the local region.

Based upon the described subject matter, as a task executes, if it encounters a call to link from the current program to another one, and this has been configured to be a distributed program link, then a policy decision could choose to dispatch the task on to a local described sub-dispatched thread rather than actually sending a request to a remote system.

Resources that are private to a local described sub-dispatched thread (whether its the original QR TCB or another local TCB) are distinguished. Application resources such as programs and files are managed locally to each local described sub-dispatched thread so as to reflect the same assignment of resources amongst local sub-dispatched threads as is the case for remote sub-dispatched application server threads.

Application awareness of concurrency arises from the sharing of memory and the reference to shared memory location by pointers from different request threads on separate physical processors. The remote programming model disallows such references when the threads are executed in different address spaces. Allocation of memory that is intended to be shared is naturally scoped by the address space when the threads execute remotely.

Use of a second local sub-dispatched thread (i.e. one in the same address space) and provision of a local memory manager that scopes the shared memory allocation to the group of threads in each sub-dispatching application server replicates the allocation behavior from the truly remote case. The semantics of the program behavior with respect to sharing of memory relies on the assumption of separation determined by the remote programming model.

Figure 6:
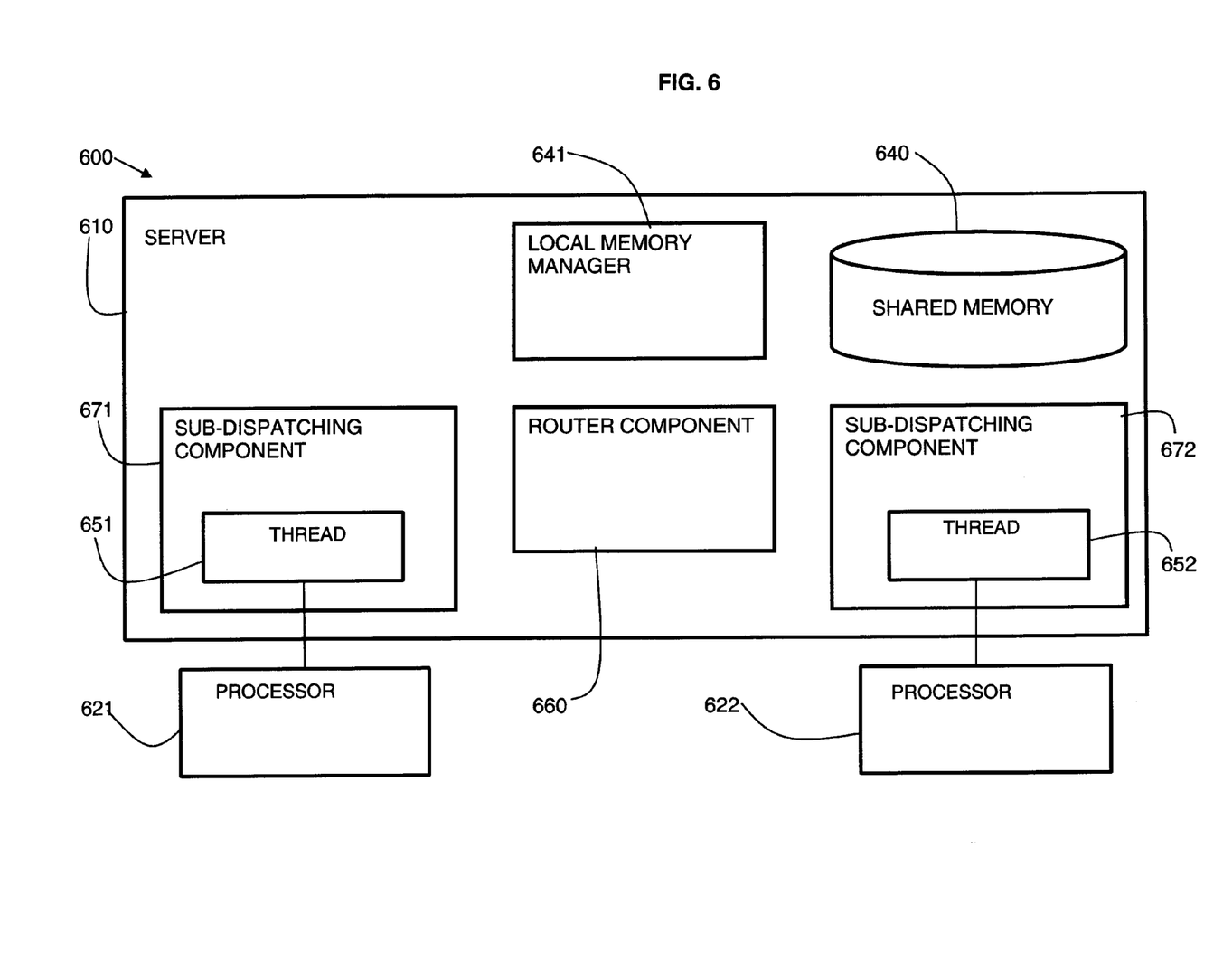
FIG. 6 is a block diagram of the components of a system of a server with two (or more) sub-dispatching components according to an aspect of the present subject matter.

Referring to FIG. 6, a block diagram shows components of the described system 600. A server 610 includes two (or more) sub-dispatching components 671, 672 each executing on its own processor 621, 622. Each sub-dispatching component 671, 672 includes a described sub-dispatched thread 651, 652 to manage a group of threads locally.

The server 610 includes shared memory 640 with a scope-aware shared memory manager 641. The server 610 also includes a router component 660 that decides whether to dispatch a request eligible to execute truly remotely to one of the local sub-dispatching components 671, 672.

Figure 7:
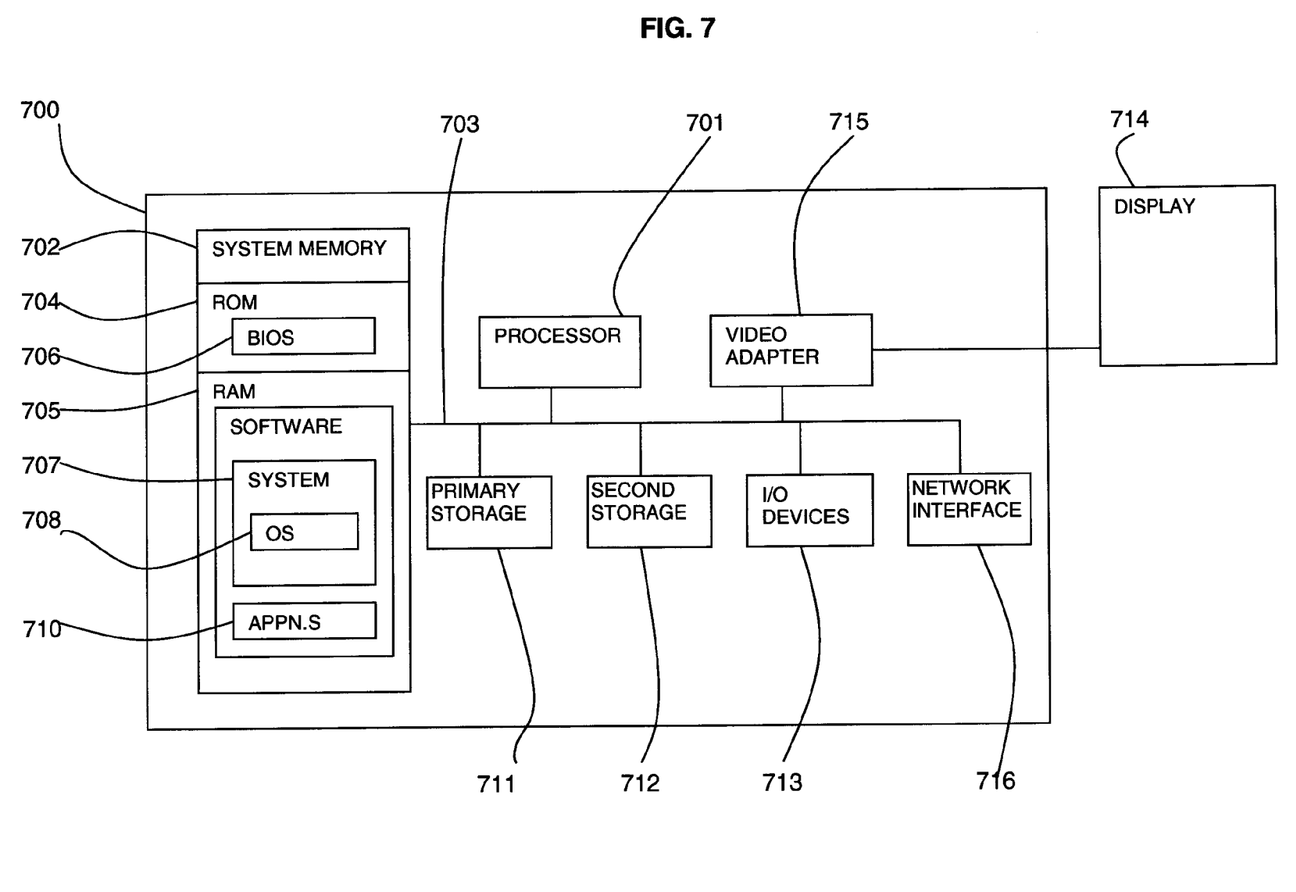
FIG. 7 is a block diagram of a computer system in which the present subject matter may be implemented according to an aspect of the present subject matter.

Referring to FIG. 7, an exemplary system for implementing the described server includes a data processing system 700 suitable for storing and/or executing program code including at least one processor 701 coupled directly or indirectly to memory elements through a bus system 703. The memory elements may include local memory employed during actual execution of the program code, bulk storage, and cache memories which provide temporary storage of at least some program code in order to reduce the number of times code must be retrieved from bulk storage during execution.

The memory elements may include system memory 702 in the form of read only memory (ROM) 704 and random access memory (RAM) 705. A basic input/output system (BIOS) 706 may be stored in ROM 704. System software 707 may be stored in RAM 705 including operating system software 708. Software applications 710 may also be stored in RAM 705.

The system 700 may also include a primary storage means 711 such as a magnetic hard disk drive and secondary storage means 712 such as a magnetic disc drive and an optical disc drive. The drives and their associated computer-readable storage media provide non-volatile storage of computer-executable instructions, data structures, program modules and other data for the system 700. Software applications may be stored on the primary and secondary storage means 711, 712 as well as the system memory 702.

The computing system 700 may operate in a networked environment using logical connections to one or more remote computers via a network adapter 716.

Input/output devices 713 may be coupled to the system either directly or through intervening I/O controllers. A user may enter commands and information into the system 700 through input devices such as a keyboard, pointing device, or other input devices (for example, microphone, joy stick, game pad, satellite dish, scanner, or the like). Output devices may include speakers, printers, etc. A display device 714 is also connected to system bus 703 via an interface, such as video adapter 715.

Figure 8:
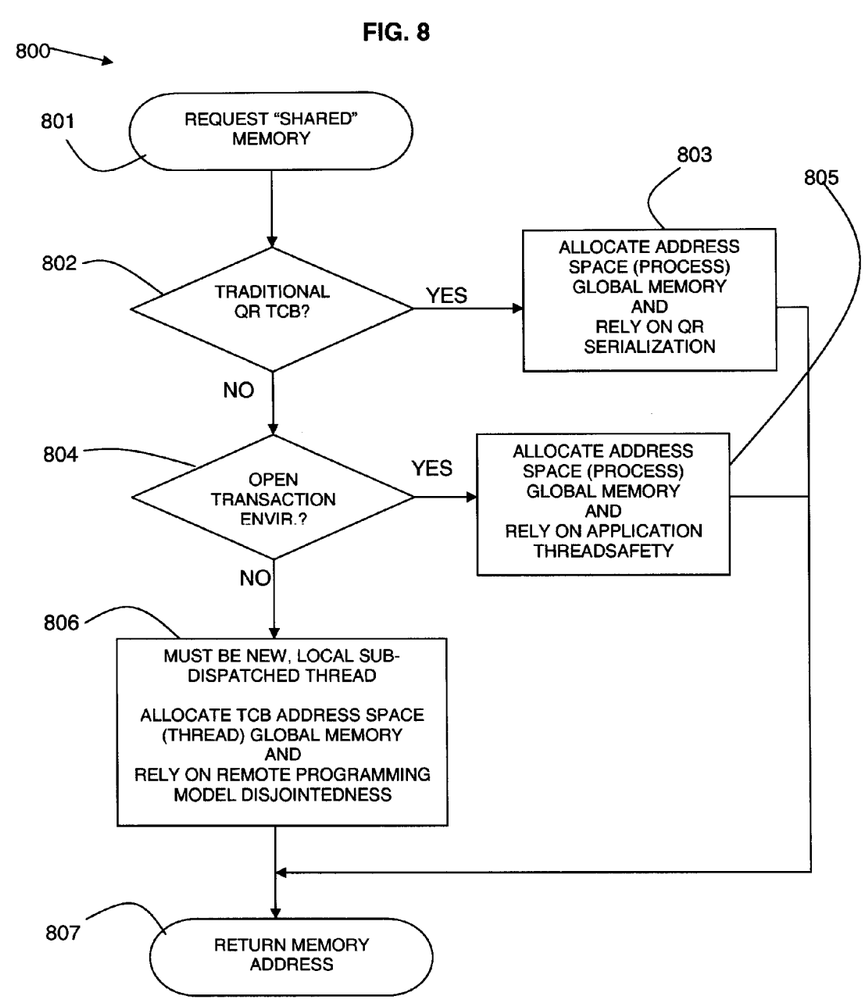
FIG. 8 is a flow diagram of a process carried out by a scope-aware shared memory manager according to an embodiment of the present subject matter.

Referring to FIG. 8, a flow diagram 800 shows an example of the process carried out by a scope-aware shared memory manager, such as the scope-aware shared memory manager 641E. A request for "shared" memory is received at 801. It is determined at 802 if the request is a traditional quasi-reentrant (QR) TCB request. If so, the process allocates at 803 address space (e.g., process) global memory and relies on QR serialization.

If the request is not a traditional QR TCB request at 802, it is determined at 804 if it is using Open Transaction Environment (OTE). If so, the process allocates at 805 address space (process) global memory and relies on application thread-safety.

If the request is not using OTE at 804, the request must be from a new, local sub-dispatched application server thread and the process allocates at 806 TCB address space (thread) global memory and relies on remote programming model disjointedness.

In each case, after allocation at 803, 805, 806 of memory, the process returns at 807 a memory address.

Figure 9:
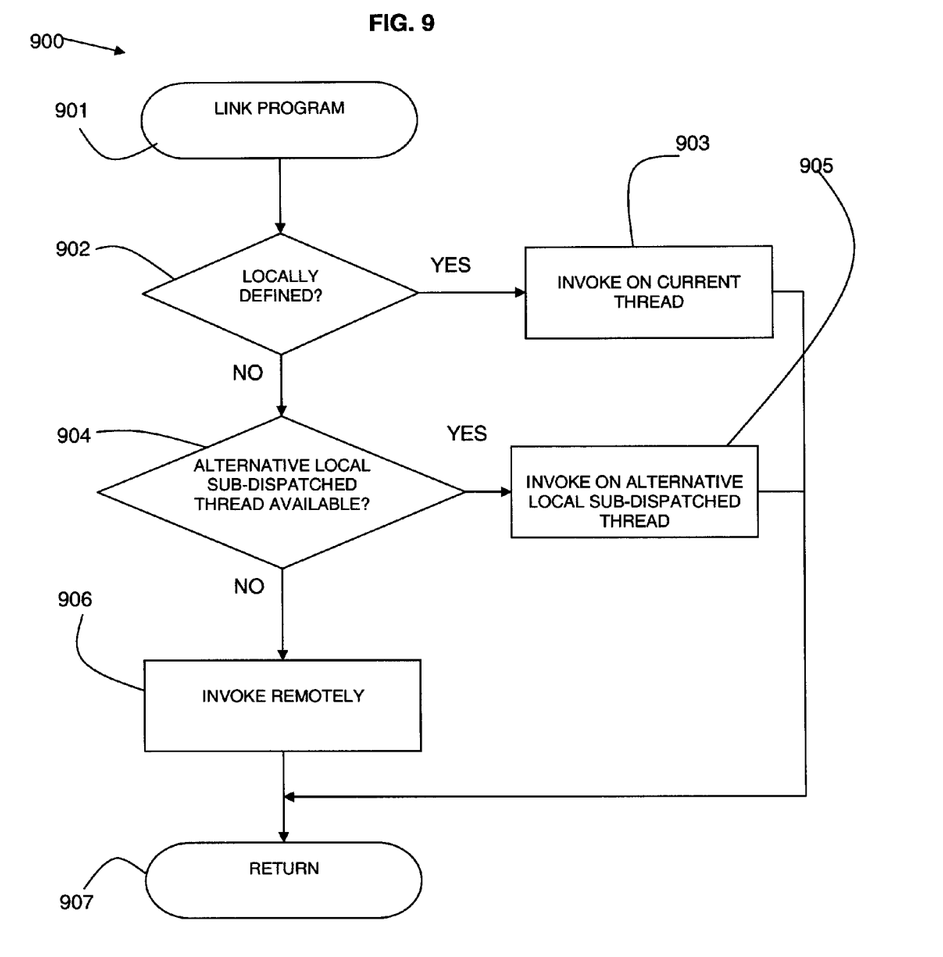
FIG. 9 is a flow diagram of a process carried out by a router component according to an embodiment of the present subject matter.

Referring to FIG. 9, a flow diagram 900 shows an example of the process carried out by a router component, such as the router component 660. The router component receives at 901 a distributed link program. It is determined at 902 if the distributed link program is locally defined. If so, it is invoked at 903 on the current thread. If it is not locally defined, it is determined at 904 if there is an alternative local sub-dispatched application server thread available. If so, it is invoked at 905 on the alternative local sub-dispatched application server thread. If there is no alternative local sub-dispatched application server thread available at 904, it is invoked remotely at 906. In each case, the process returns at 907.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Improvements and modifications may be made to the foregoing without departing from the scope of the present subject matter.

The invention claimed is:

1. A method for operating a transaction server with sub-dispatched application server threads comprising:
   providing multiple sub-dispatched application server threads in a single local process, wherein the multiple sub-dispatched application server threads carry out their own task dispatching;
   linking the multiple sub-dispatched application server threads in the single local process using a distributed programming model;
   managing scope-aware access by the multiple sub-dispatched application server threads to shared memory content; and
   determining if an application request is eligible to execute at a local sub-dispatched application server thread.

2. The method of claim 1, wherein the distributed programming model comprises a distributed program link (DPL) component and further comprising, passing, via the DPL component, the application request to a remote sub-dispatched application server thread for execution comprising passing input parameters and receiving output parameters on return, wherein the parameters passed are self-contained.

3. The method of claim 1, further comprising, via the multiple sub-dispatched application server threads, preventing a single task assignment characteristic and preventing execution of arbitrary code that might suspend.

4. The method of claim 1, wherein the multiple sub-dispatched application server threads execute code obeying the requirements of quasi-reentrant threads, comprising preventing a thread from waiting to use operation system services that would deny other tasks on the thread an opportunity to execute.

5. The method of claim 1, further comprising, via the multiple sub-dispatched application server threads, managing distinct sets of resources and sharing other resources.

6. The method of claim 1, wherein managing the scope-aware access by the multiple sub-dispatched application server threads to the shared memory content comprises:
   determining a shared memory request is from the local sub-dispatched application server thread; and
   allocating global memory to the local sub-dispatched application server thread.

7. The method of claim 1, wherein determining if the application request is eligible to execute at the local sub-dispatched application server thread comprises:
   determining a link program request is not locally defined;
   determining the local sub-dispatched application server thread is available; and
   invoking the link program on the local sub-dispatched application server thread.

8. A system, comprising:
   a shared memory; and
   at least one processor programmed to execute:
      a transaction server configured to:
         provide multiple sub-dispatched application server threads in a single local process, wherein each sub-dispatched application server thread is managed by a sub-dispatching component; and
         link the multiple sub-dispatched application server threads in the single local process using a distributed programming model; and
      a local memory manager that is scope-aware for managing access by the multiple sub-dispatched application server threads to shared memory content within the shared memory; and
      a router component for determining if an application request is eligible to execute at a local sub-dispatched application server thread.

9. The system of claim 8, wherein the distributed programming model comprises a distributed program link (DPL) component configured to pass the application request to a remote sub-dispatched application server thread for execution comprising passing input parameters and receiving output parameters on return, wherein the parameters passed are self-contained.

10. The system of claim 8, wherein the multiple sub-dispatched application server threads prevent a single task assignment characteristic and prevent execution of arbitrary code that might suspend.

11. The system of claim 8, wherein the multiple sub-dispatched application server threads execute code obeying the requirements of quasi-reentrant threads, to prevent a thread from waiting to use operation system services that would deny other tasks on the thread an opportunity to execute.

12. The system of claim 8, wherein the transaction server is further configured to, via the multiple sub-dispatched application server threads, manage distinct sets of resources and share other resources.

13. The system of claim 8, wherein the local memory manager is configured to:
   determine if a shared memory request is from the local sub-dispatched application server thread; and
   allocate global memory to the local sub-dispatched application server thread.

14. A computer program product stored on a computer readable storage medium for operating a transaction server with sub-dispatched application server threads, comprising computer readable program code configured to:
   provide multiple sub-dispatched application server threads in a single local process, wherein the multiple sub-dispatched application server threads carry out their own task dispatching;
   link the multiple sub-dispatched application servers threads in the single local process using a distributed programming model;
   manage scope-aware access by the multiple sub-dispatched application server threads to shared memory content; and
   determine if an application request is eligible to execute at a local sub-dispatched application server thread.

15. The computer program product of claim 14, wherein the distributed programming model comprises a distributed program link (DPL) component and further comprising computer readable program code configured to pass, via the DPL component, an application request to a remote sub-dispatched application server thread for execution comprising passing input parameters and receiving output parameters on return, wherein the parameters passed are self-contained.

16. The computer program product of claim 14, wherein the computer readable program code configured to provide the multiple sub-dispatched application server threads comprises computer readable program code configured to provide multiple sub-dispatched program server threads that prevent a single task assignment characteristic and prevent execution of arbitrary code that might suspend.

17. The computer program product of claim 14, wherein the computer readable program code configured to provide the multiple sub-dispatched application server threads comprises computer readable program code configured to provide multiple sub-dispatched program server threads that execute code obeying the requirements of quasi-reentrant threads, to prevent a thread from waiting to use operation system services that would deny other tasks on the thread an opportunity to execute.

18. The computer program product of claim 14, wherein the computer readable program code configured to provide the multiple sub-dispatched application server threads comprises computer readable program code configured to provide multiple sub-dispatched program server threads that manage distinct sets of resources and share other resources.

19. The computer program product of claim 14, wherein the computer readable program code configured to manage the scope-aware access by the multiple sub-dispatched application server threads to the shared memory content comprises computer readable program code configured to:
   determine a shared memory request is from the local sub-dispatched application server thread; and
   allocate global memory to the local sub-dispatched application server thread.

20. The computer program product of claim 14, wherein the computer readable program code configured to determine if the application request is eligible to execute at the local sub-dispatched application server thread comprises computer readable program code configured to:
   determine a link program request is not locally defined;
   determine the local sub-dispatched application server thread is available; and
   invoke the link program on the local sub-dispatched application server thread.

* * * * *